(12) United States Patent
Hansen et al.

(10) Patent No.: US 7,746,886 B2
(45) Date of Patent: Jun. 29, 2010

(54) ASYMMETRICAL MIMO WIRELESS COMMUNICATIONS

(75) Inventors: Christopher J. Hansen, Sunnyvale, CA (US); Jason A. Trachewsky, Menlo Park, CA (US); Nambirajan Seshadri, Irvine, CA (US); Kelly Brian Cameron, Irvine, CA (US); Hau Thien Tran, Irvine, CA (US); Ba-Zhong Shen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1199 days.

(21) Appl. No.: 10/979,368

(22) Filed: Nov. 1, 2004

(65) Prior Publication Data
US 2005/0185575 A1 Aug. 25, 2005

Related U.S. Application Data

(60) Provisional application No. 60/575,920, filed on Jun. 1, 2004, provisional application No. 60/556,264, filed on Mar. 25, 2004, provisional application No. 60/545,854, filed on Feb. 19, 2004.

(51) Int. Cl.
*H04W 76/00* (2006.01)
(52) U.S. Cl. ..................... 370/437; 370/465
(58) Field of Classification Search ................ 370/437, 370/465
See application file for complete search history.

(56) References Cited

U.S. PATENT DOCUMENTS

2002/0193146 A1 * 12/2002 Wallace et al. ............. 455/562
2003/0235147 A1 * 12/2003 Walton et al. .............. 370/204
2005/0265225 A1 * 12/2005 Mahadevappa et al. ..... 370/210
2006/0093066 A1 * 5/2006 Jeong et al. ................ 375/299

OTHER PUBLICATIONS

Lam et al., 'Self-Matching Space-Time Block Codes for Matrix Kalman Estimator-Based ML Detector in MIMO Fading Channels', Jul. 2007, IEEE Transactions on Vehicular Technology, vol. 56, Issue 4, Part 2, pp. 2130-2142.*
Hollanti et al., 'Asymmetric Space-Time Block Codes for MIMO Systems', Jul. 2007, Information Theory for Wireless Networks, pp. 1-5.*
Khalighi et al., 'Semi-Blind Channel Estimation Using the EM Algorithm in Herative MIMO APP Detectors', Nov. 2006, IEEE Transactions on Wireless Communications, vol. 5, No. 11, pp. 3165-3173.*
Sun et al., 'Space-Time Precoding for Asymmetric MIMO Channels', 2006, Wireless Communications and Networking Conference, pp. 1316-1321.*
Wong et al., 'List Slab-Sphere Decoding: Efficient High-Performance Decoding for Asymmetric MIMO Antenna Systems', May/Jun. 2005, Vehicular Technology Conference, vol. 1, pp. 697-701.*
Sumeet Sandhu, 'Transmit diversity for MIMO-OFDM', IEEE 802.11-11-03-0847-00-000n, Nov. 2003, pp. 1-11.*

* cited by examiner

*Primary Examiner*—Melvin Marcelo
(74) *Attorney, Agent, or Firm*—Garlick Harrison & Markison; Bruce E. Stuckman

(57) ABSTRACT

A method for asymmetrical MIMO wireless communication begins by determining a number of transmission antennas for the asymmetrical MIMO wireless communication. The method continues by determining a number of reception antennas for the asymmetrical MIMO wireless communication. The method continues by, when the number of transmission antennas exceeds the number of reception antennas, using spatial time block coding for the asymmetrical MIMO wireless communication. The method continues by, when the number of transmission antennas does not exceed the number of reception antennas, using spatial multiplexing for the asymmetrical MIMO wireless communication.

20 Claims, 19 Drawing Sheets

|              | Antenna 0 | Antenna 1 | Antenna 2 | Antenna 3 |
|--------------|-----------|-----------|-----------|-----------|
| Symbol m     | s0        | s1        | s2        | s3        |
| Symbol m+1   | -s1*      | s0*       | -s3*      | s2*       |
| Symbol m+2   | s4        | s5        | s6        | s7        |
| Symbol m+3   | -s4*      | -s5*      | s6*       | s7*       |

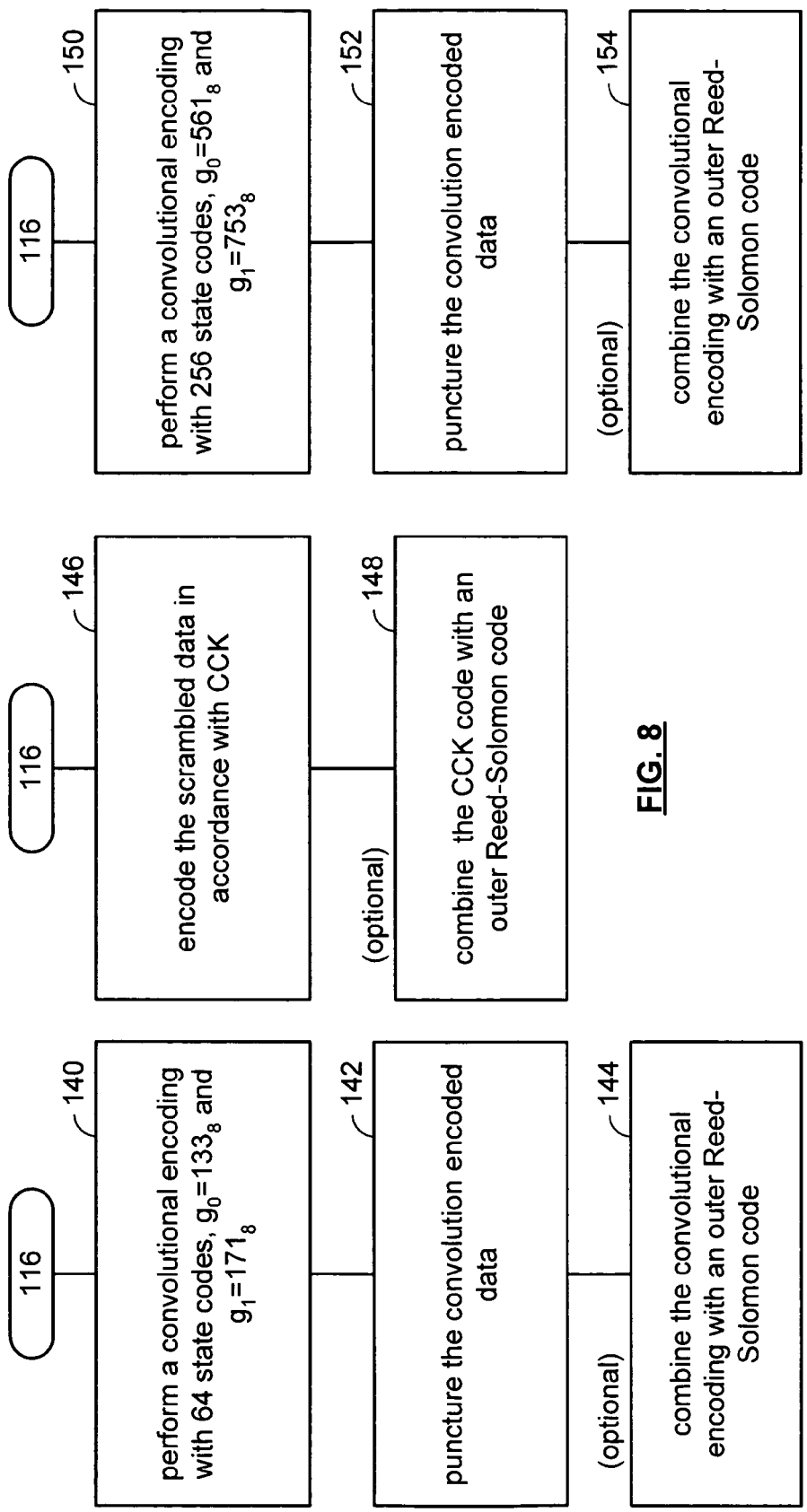

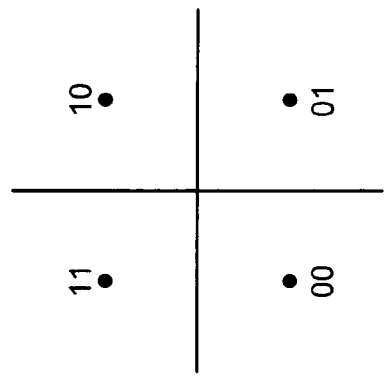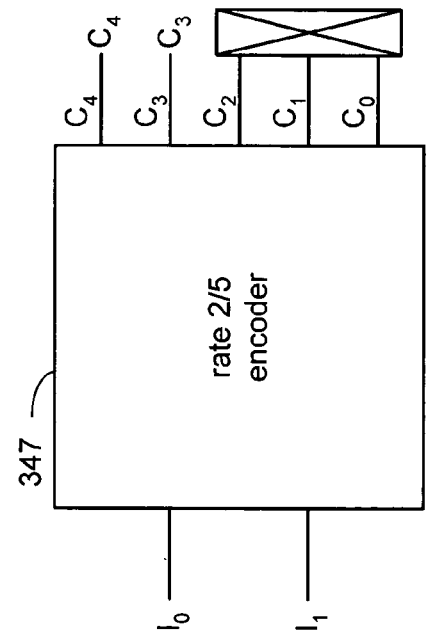
FIG. 17
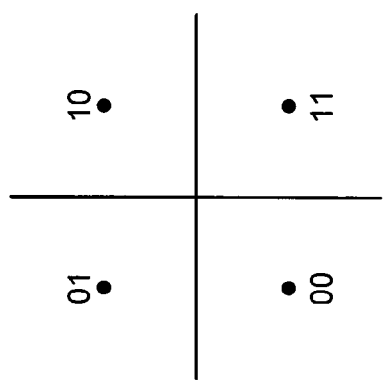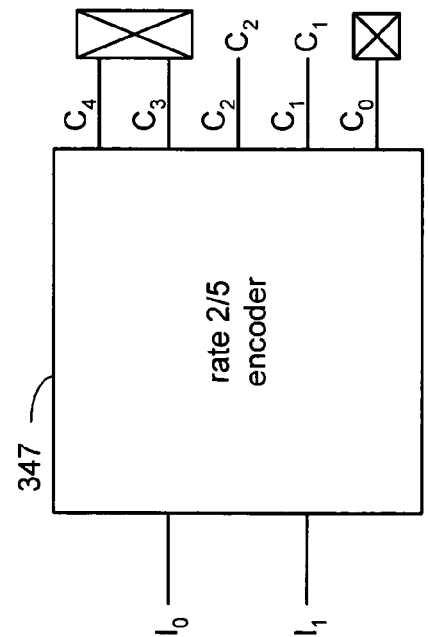
FIG. 16

|  | Antenna 0 | Antenna 1 |
|---|---|---|
| Symbol m | s0 | s1 |
| Symbol m+1 | -s1* | s0* |

FIG. 22

|  | Antenna 0 | Antenna 1 | Antenna 2 |
|---|---|---|---|
| Symbol m | s0 | s1 | s2 |
| Symbol m+1 | -s1* | s0* | s3 |

FIG. 23

|  | Antenna 0 | Antenna 1 | Antenna 2 |
|---|---|---|---|
| Symbol m | s0 | s1 | s2 |
| Symbol m+1 | -s1* | s0* | s3 |
| Symbol m+2 | s4 | s5 | s6 |
| Symbol m+3 | -s6* | s7 | s4* |
| Symbol m+4 | s8 | s9 | s10 |
| Symbol m+5 | s11 | -s9* | s10* |

FIG. 24

|  | Antenna 0 | Antenna 1 | Antenna 2 | Antenna 3 |
|---|---|---|---|---|
| Symbol m | s0 | s1 | s2 | s3 |
| Symbol m+1 | -s1* | s0* | -s3* | s2* |

FIG. 25

|  | Antenna 0 | Antenna 1 | Antenna 2 | Antenna 3 |
|---|---|---|---|---|
| Symbol m | s0 | s1 | s2 | s3 |
| Symbol m+1 | -s1* | s0* | -s3* | s2* |
| Symbol m+2 | s4 | s5 | s6 | s7 |
| Symbol m+3 | -s4* | -s5* | s6* | s7* |

FIG. 26

ASYMMETRICAL MIMO WIRELESS COMMUNICATIONS

This invention is claiming priority under 35 USC § 119(e) to three provisional patent applications: the first is entitled WLAN TRANSMIITER HAVING HIGH DATA THROUGHPUT having a filing date of Feb. 19, 2004 and a provisional Ser. No. 60/545,854; the second is entitled MULTIPLE INPUT MULTIPLE OUTPUT WIRELESS LOCAL AREA NETWORK COMMUNICATIONS having a provisional Ser. No. 60/556,264 and a filing date of Mar. 25, 2004; and the third has the same title as the present patent application, a provisional Ser. No. 60/575,920, and a provisional filing date of Jun. 1, 2004.

BACKGROUND OF THE INVENTION

1. Technical Field of the Invention

This invention relates generally to wireless communication systems and more particularly to a transmitter transmitting at high data rates within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard. As such, a transmitter capable of MIMO wireless communications should also be backward compatible with legacy devices to function in a majority of existing WLANs.

Further, asymmetric MIMO is any M transmit antenna, N receive antenna communication system in which M !=N. The case of M<N does not need to be considered by the 802.11n standard. However, the practical case of M>N does. This case may happen when an access point (AP) with many antennas attempts to send frames to devices with only two (e.g. an old laptop PC). This case may also be relevant to certain broadcast/multicast Greenfield frame transmissions, e.g. beacons.

Therefore, a need exists for a WLAN transmitter that is capable of high data throughput, is backward compatible with legacy devices, and supports asymmetrical MIMO transmissions.

BRIEF SUMMARY OF THE INVENTION

The asymmetrical wireless communication of the present invention substantially meets these needs and others. In one embodiment, a method for asymmetrical MIMO wireless communication begins by determining a number of transmission antennas for the asymmetrical MIMO wireless communication. The method continues by determining whether the asymmetric MIMO wireless communication will use spatial multiplexing or space-time block coding based on the number of transmission antennas. The method continues, for spatial multiplexing, by providing different constellation points for transmission on each of the number of transmission antennas. The method continues by, for space-time block coding: during a first time interval: providing, for transmission on a first one of the number of transmission antennas, a first constellation point, and providing, for transmission on a second one of the number of transmission antennas, a second constellation point. The method continues by, during a second time interval: providing, for transmission on the first one of the number of transmission antennas, an inverse complex conjugate of the second constellation point, and providing, for transmission on the second one of the number of transmission antennas, a complex conjugate of the second constellation point.

In another embodiment, a method for asymmetrical MIMO wireless communication begins by determining a number of transmission antennas for the asymmetrical MIMO wireless communication. The method continues by determining a number of reception antennas for the asymmetrical MIMO wireless communication. The method continues by, when the number of transmission antennas exceeds the number of reception antennas, using spatial time block coding for the asymmetrical MIMO wireless communication. The method continues by, when the number of transmission antennas does not exceed the number of reception antennas, using spatial multiplexing for the asymmetrical MIMO wireless communication.

BRIEF DESCRIPTION OF THE SEVERAL VIEWS OF THE DRAWINGS

FIGS. 7-9 illustrate logic diagrams of various embodiments for encoding the scrambled data in accordance with the present invention;

FIG. 16 is a schematic block diagram of a puncture encoder in accordance with the present invention;

FIG. 17 is a schematic block diagram of another embodiment of a puncture encoder in accordance with the present invention;

FIG. 22 is a diagram of two antenna asymmetrical wireless communication in accordance with the present invention;

FIG. 23 is a diagram of three antenna asymmetrical wireless communication in accordance with the present invention;

FIG. 24 is another diagram of three antenna asymmetrical wireless communication in accordance with the present invention;

FIG. 25 is a diagram of four antenna asymmetrical wireless communication in accordance with the present invention; and FIG. 26 is another diagram of four antenna asymmetrical wireless communication in accordance with the present invention;

DETAILED DESCRIPTION OF THE INVENTION

Figure 1:
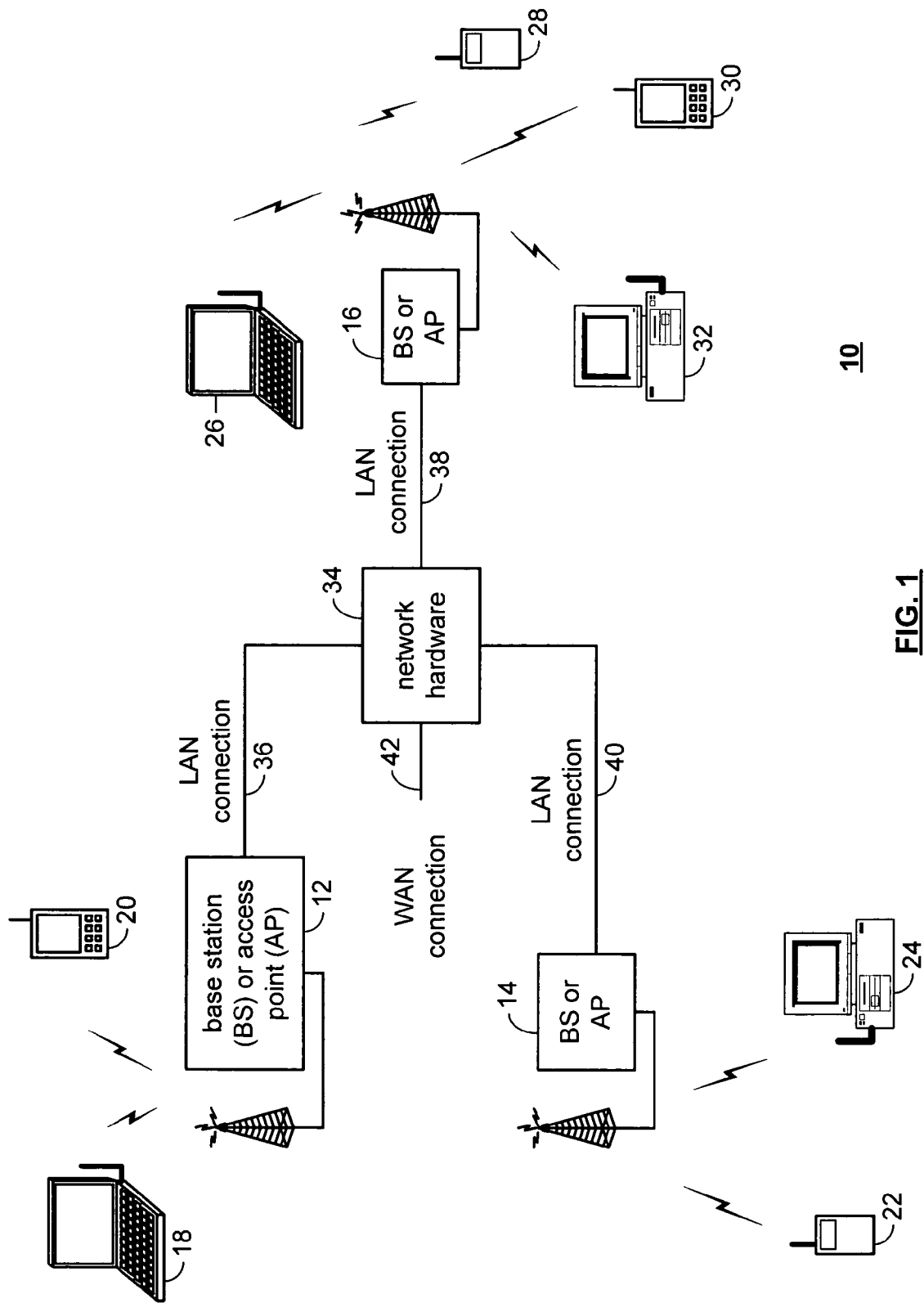
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
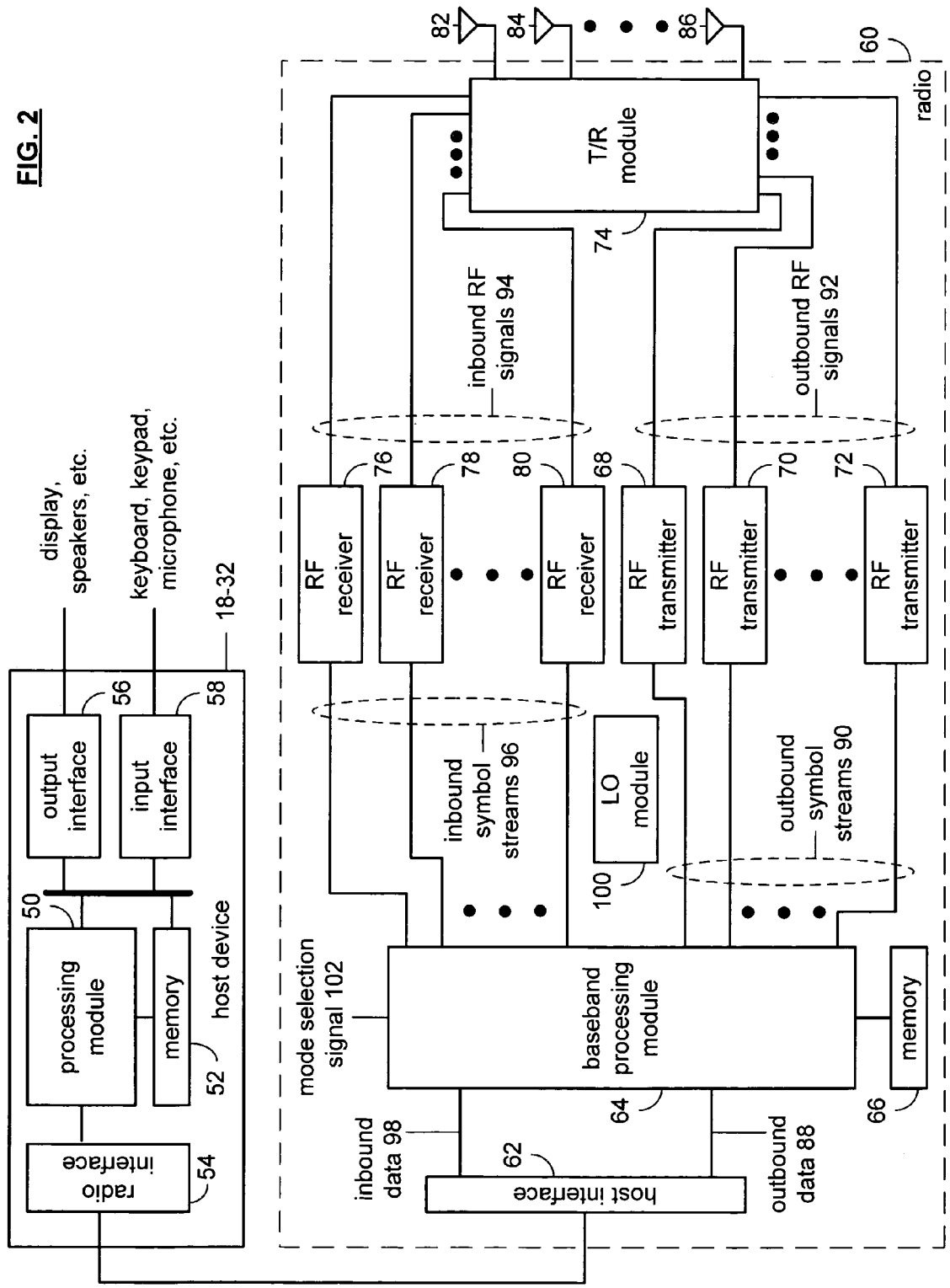
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to FIGS. 5-19, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennas may be utilized to achieve the higher bandwidths. In this instance, the mode select would further indicate the number of antennas to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennas and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennas and a corresponding spatial time code rate. Table 10 further illustrates a particular modulation scheme code rate and NBPSC values. Table 11 provides the power spectral density mask for table 10 and table 12 provides the channelization for table 10.

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
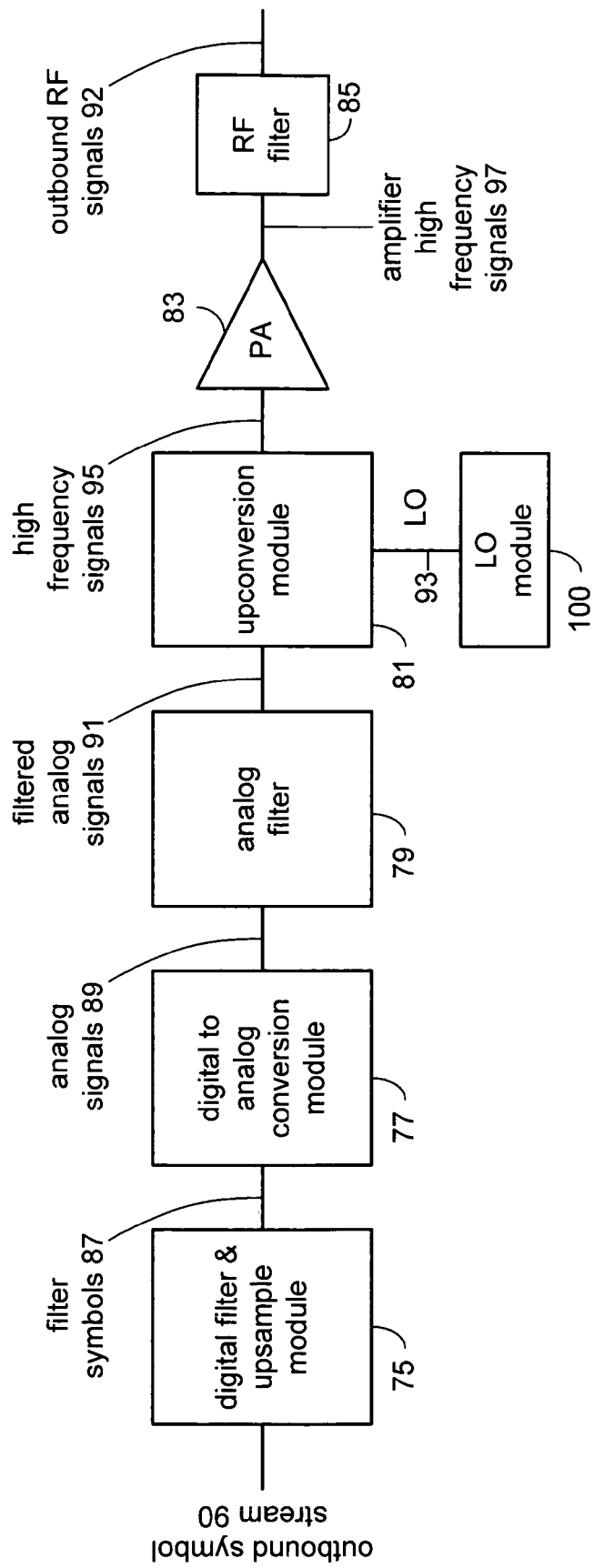
FIG. 3 is a schematic block diagram of an RF transmitter in accordance with the present invention.

FIG. 3 is a schematic block diagram of an embodiment of an RF transmitter 68-72. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
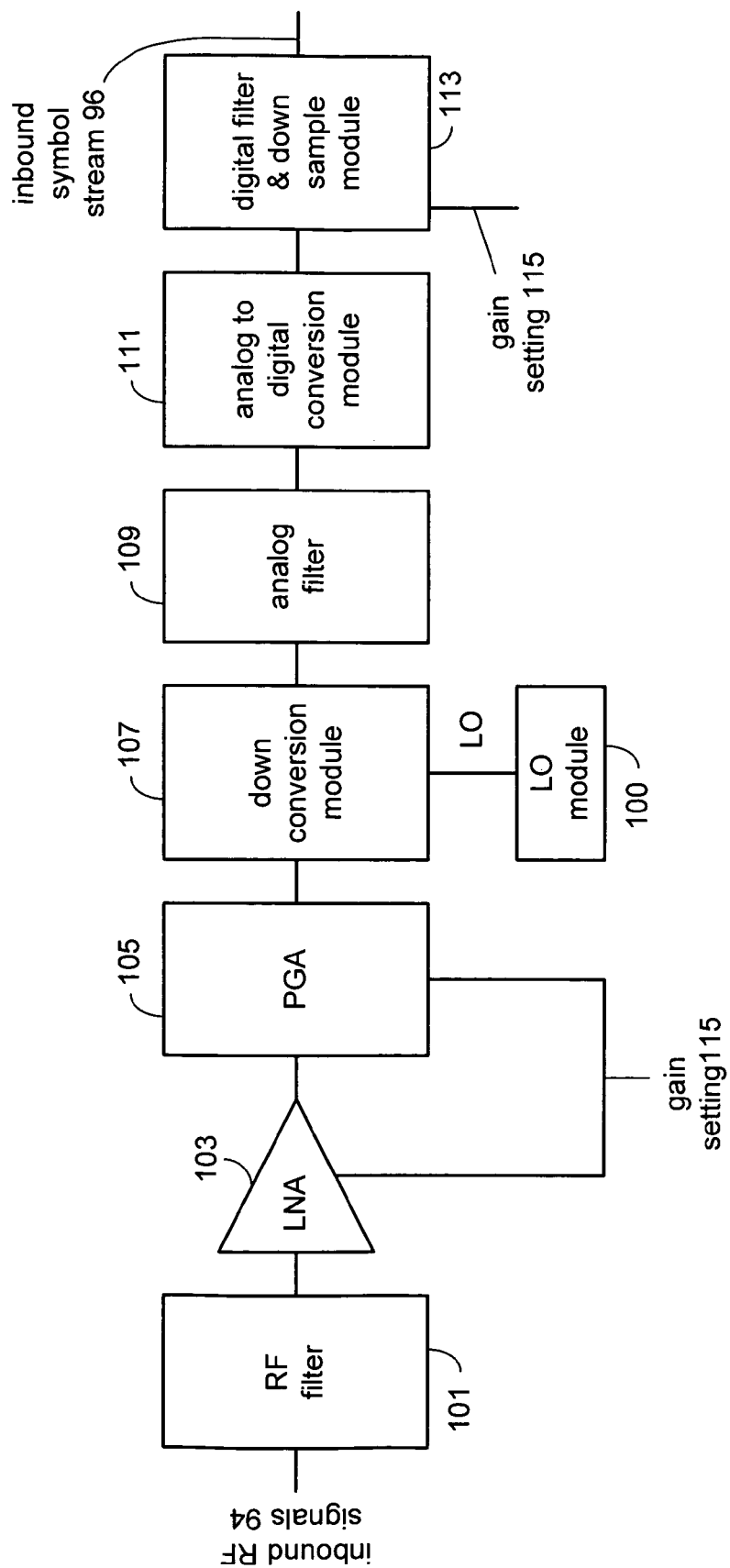
FIG. 4 is a schematic block diagram of an RF receiver in accordance with the present invention.

FIG. 4 is a schematic block diagram of each of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting 115 and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the inbound symbol stream 96.

Figure 5:
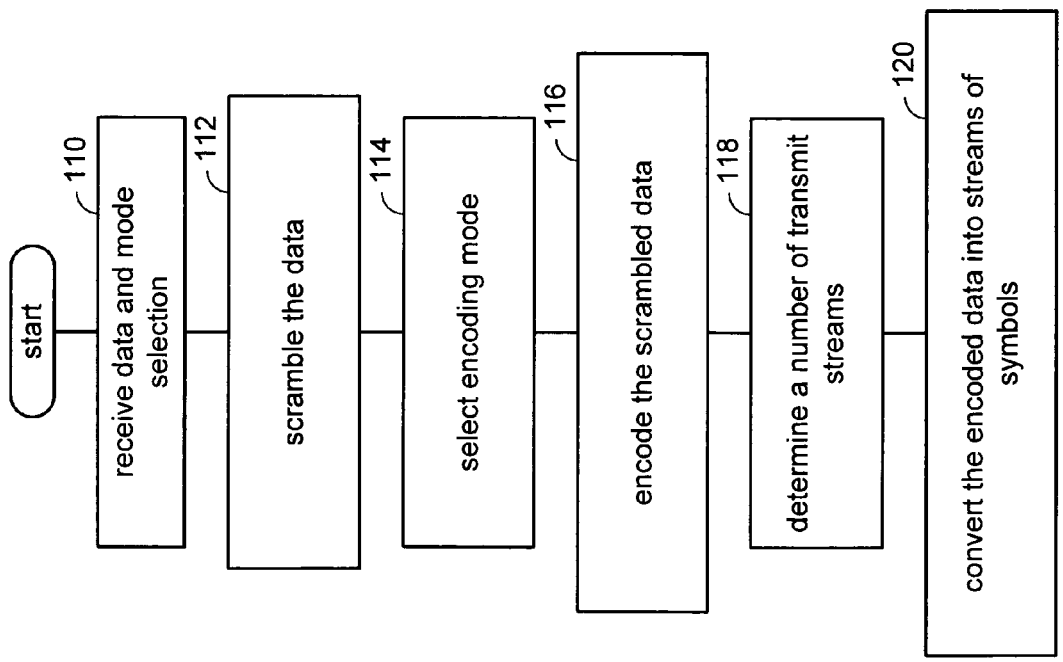
FIG. 5 is a logic diagram of a method for baseband processing of data in accordance with the present invention.

FIG. 5 is a logic diagram of a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing a parallel concatenated turbo encoding scheme and/or a low density parity check block encoding scheme. Such encoding schemes will be described in greater detail with reference to FIGS. 12-19. Alternatively, the encoding may be done as further described in FIGS. 7-9 which will be described below.

The process then proceeds to Step 118 where the baseband processing module determines a number of transmit streams based on the mode select signal. For example, the mode select signal will select a particular mode which indicates that 1, 2, 3, 4 or more antennas may be utilized for the transmission. Accordingly, the number of transmit streams will correspond to the number of antennas indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
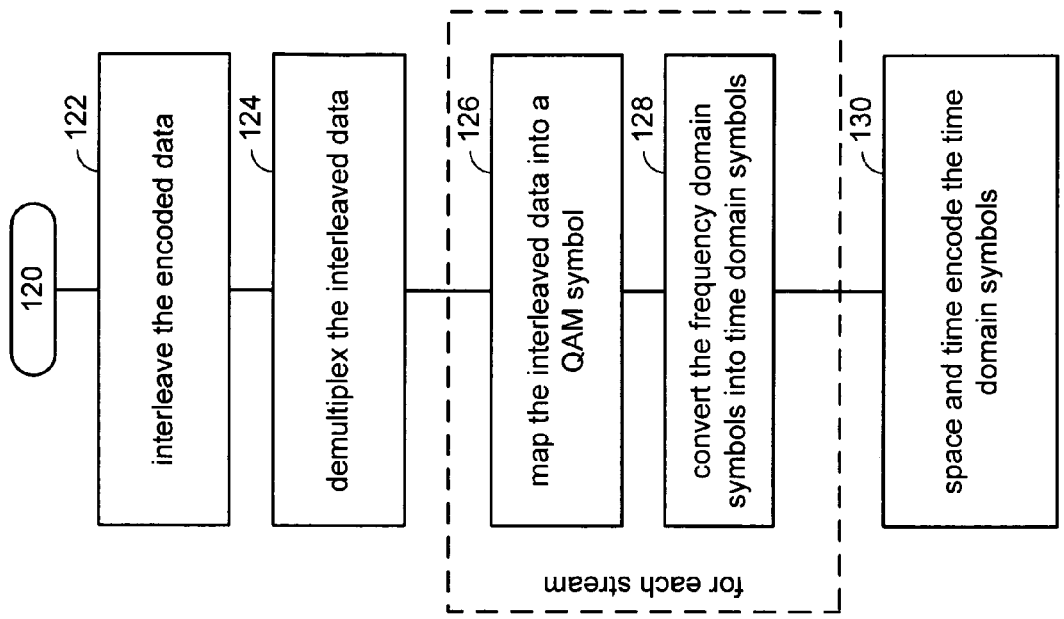
FIG. 6 is a logic diagram of a method that further defines Step 120 of FIG. 5.

FIG. 6 is a logic diagram of a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennas indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=M+1. In one embodiment the encoding matrix may comprise a form of:

$$\begin{bmatrix} C_1 & C_2 & C_3 & \cdots & C_{2M-1} \\ -C_2^* & C_1^* & C_4 & \cdots & C_{2M} \end{bmatrix}$$

where the number of rows of the encoding matrix corresponds to M and the number of columns of the encoding matrix corresponds to P. The particular symbol values of the constants within the encoding matrix may be real or imaginary numbers.

FIG. 7 is a logic diagram of one method that may be utilized by the baseband processing module to encode the scrambled data at Step 116 of FIG. 5. In this method, the process begins at Step 140 where the baseband processing module performs a convolutional encoding with 64 state codes and generator polynomials of $G_0=133_8$ and $G_1=171_8$ on the scrambled data to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔rds and/or ¾, or any rate as specified in tables 1-12. Note that, for a particular, mode, the rate may be selected for backward compatibility with IEEE 802.11(a) and/or IEEE 802.11(g) rate requirements.

The encoding of FIG. 7 may further include an optional Step 144 where the baseband processing module combines the convolutional encoding with an outer Reed Solomon code to produce the convolutional encoded data. Note that Step 144 would be conducted in parallel with Step 140.

FIG. 8 is a logic diagram of another encoding method that may be utilized by the baseband processing module to encode the scrambled data at Step 116 of FIG. 5. In this embodiment, the process begins at Step 146 where the baseband processing module encodes the scrambled data in accordance with a complimentary code keying (CCK) code to produce the encoded data. This may be done in accordance with IEEE 802.11(b) specifications and/or IEEE 802.11(g) specifications. The encoding may include an optional Step 148, which is performed in parallel with Step 146 that combines the CCK code with an outer Reed Solomon code to produce the encoded data.

FIG. 9 is a logic diagram of yet another method for encoding the scrambled data at Step 116, which may be performed by the baseband processing module. In this embodiment, the process begins at Step 150 where the baseband processing module performs a convolutional encoding with 256 state codes and generator polynomials of $G_0=561_8$ and $G_1=753_8$ on the scrambled data to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
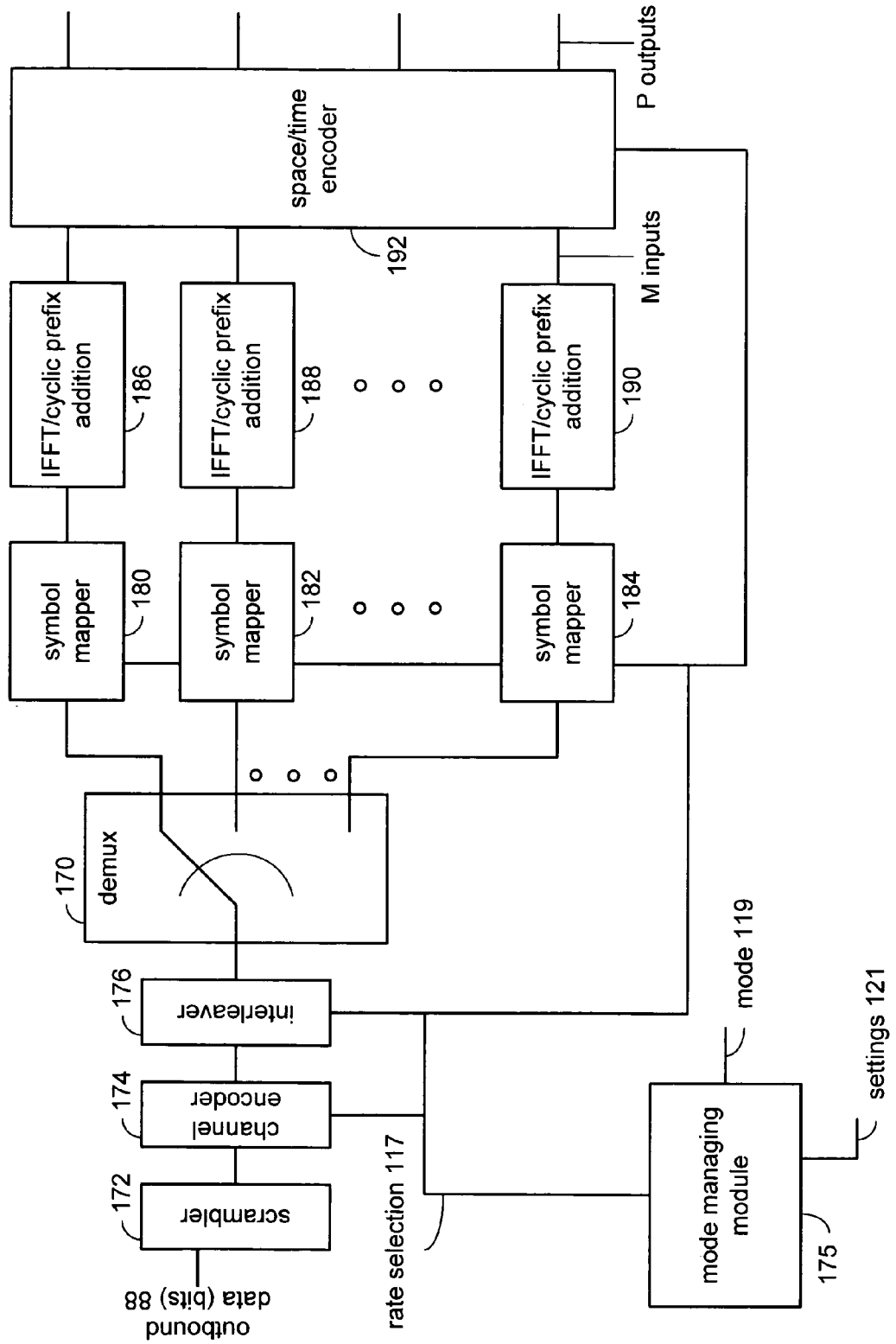
FIGS. 10A and 10B are a schematic block diagram of a radio transmitter in accordance with the present invention.
Figure 10B:
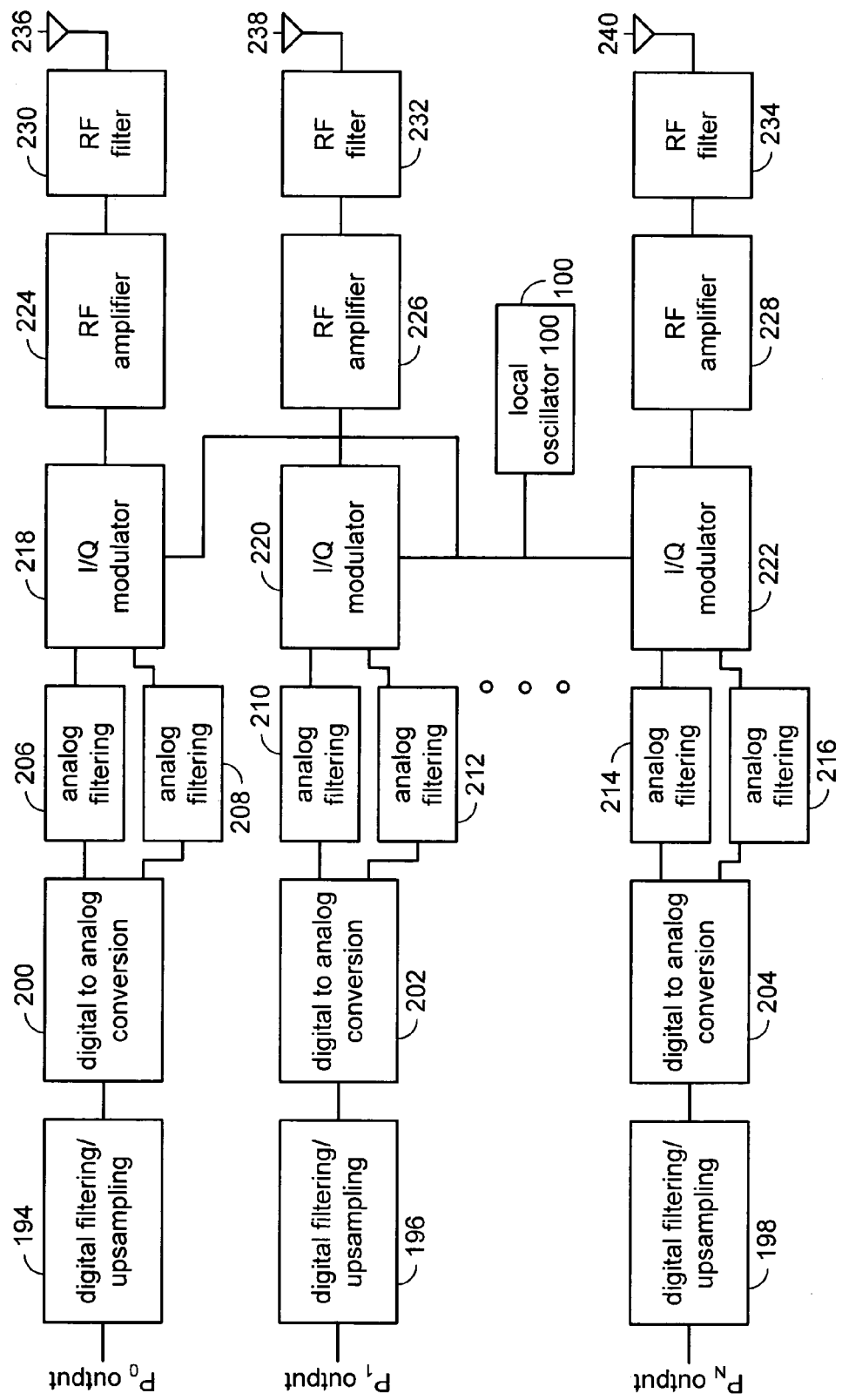

FIGS. 10A and 10B illustrate a schematic block diagram of a multiple transmitter in accordance with the present invention. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 119 and produces settings 121 for the radio transmitter portion and produces the rate selection 117 for the baseband portion.

In operations, the scrambler 172 adds (in GF2) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔rds and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to FIGS. 12-19.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal M+1 paths. For each of the paths, the space/time encoder multiples the input symbols with an encoding matrix that has the form of $$\begin{bmatrix} C_1 & C_2 & C_3 & \cdots & C_{2M-1} \\ -C_2^* & C_1^* & C_4 & \cdots & C_{2M} \end{bmatrix}$$

Note that the rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennas 236-240. The P-outputs from the space/time encoder 192 are received by respective digital filtering/up-sampling modules 194-198.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennas 236-240.

Figure 11A:
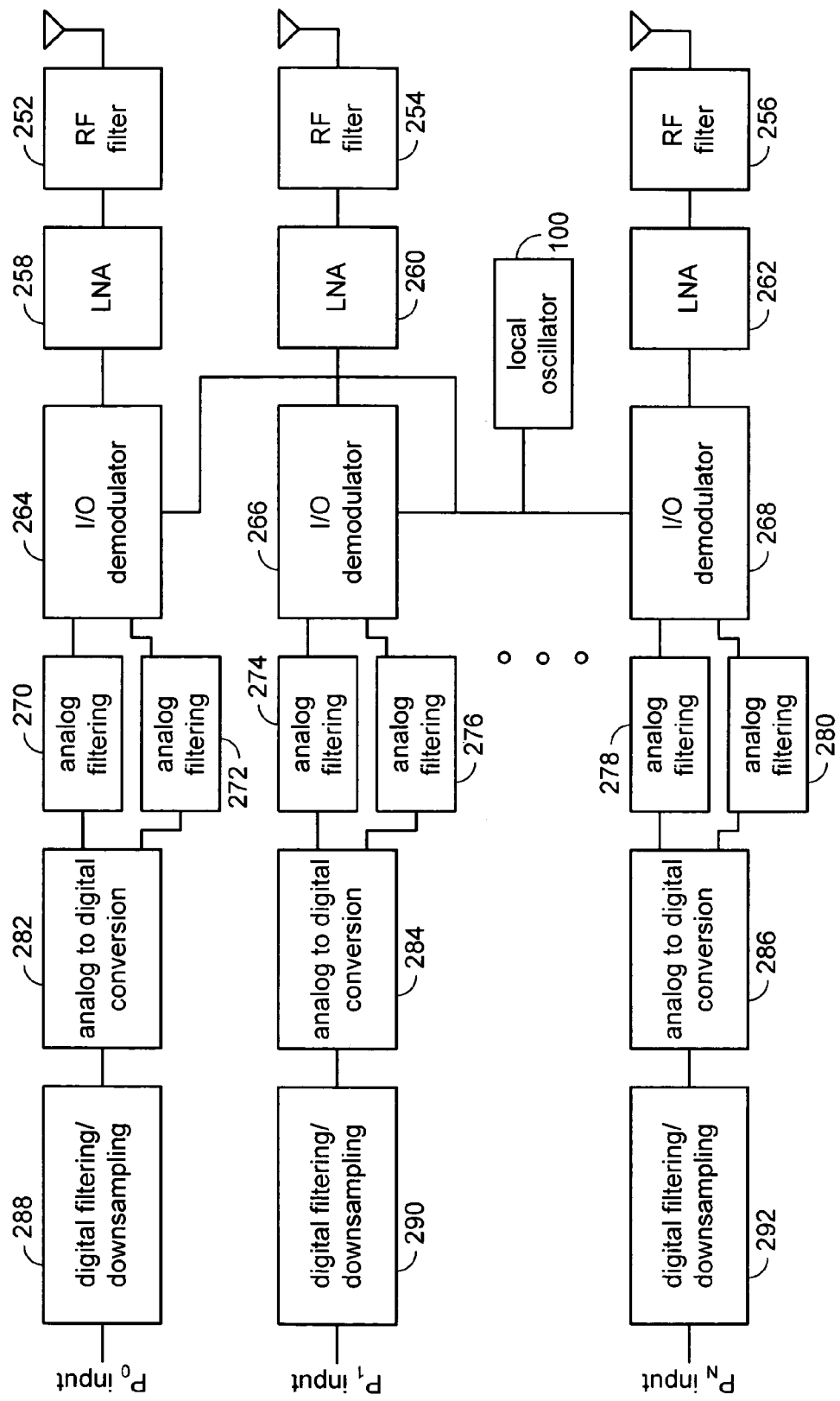
FIGS. 11A and 11B are a schematic block diagram of a radio receiver in accordance with the present invention.
Figure 11B:
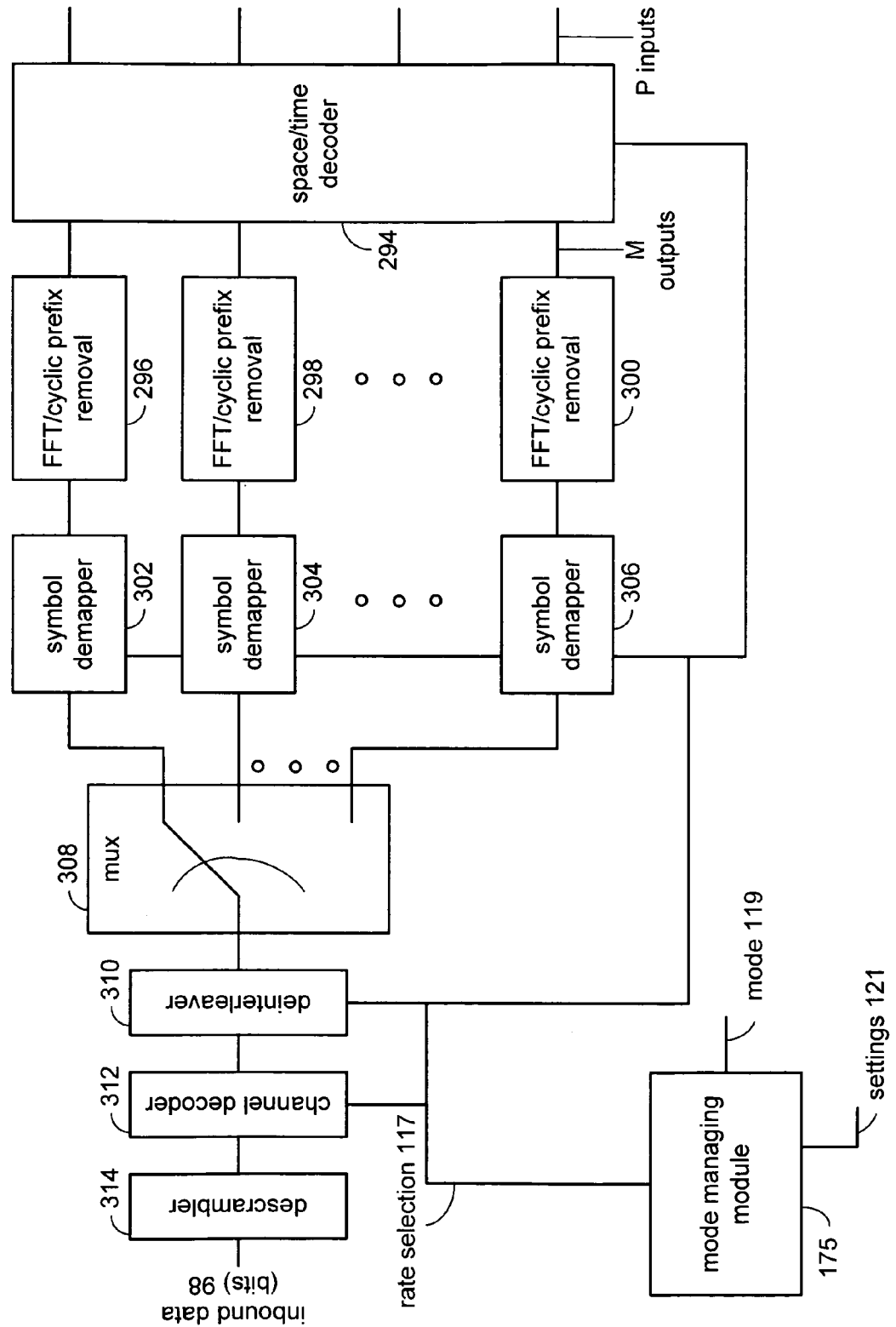

FIGS. 11A and 11B illustrate a schematic block diagram of another embodiment of a receiver in accordance with the present invention. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennas receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98. The baseband portion of the transmitter may further include a mode manager module 175 that receives the mode selection signal 119 and produces settings 121 for the radio receiver portion and produces the rate selection 117 for the baseband portion.

Figure 12:
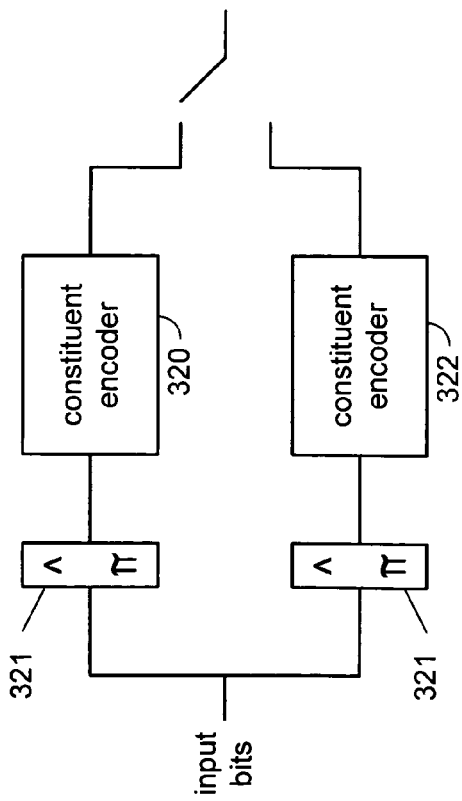
FIG. 12 is a schematic block diagram of a channel encoder in accordance with the present invention.

FIG. 12 is a schematic block diagram of channel encoder 174 implemented as a turbo encoder. In this embodiment, the turbo encoder receives input bits, modifies them 321, processes them via a constituent encoder 320-322 and interleaves them to produce the corresponding encoded output. Depending on the particular symbol mapping (BPSK, QPSK, 8PSK (phase shift keying), 64 QAM, 16 QAM or 16APSK (amplitude phase shift keying), the turbo encoder will function in the same manner to produce the encoded data. For instance, of $\pi_0$ and $\pi_1$, are interleaves of MSB (most significant bit) and LSB (least significant bit), respectively, for a block of 2-bit symbols and $\pi_L^{-1}$, L=0, are the inverses, then the modified interleave is as follows:

$$\pi''l(i) = \begin{pmatrix} i: i\text{mod}2 = 0 \\ \pi - 1(i): i\text{mod}2 = 1 \end{pmatrix}$$

and $$\pi l(i) = \begin{pmatrix} i: i\text{mod}2 = 1 \\ \pi(i): i\text{mod}2 = 0 \end{pmatrix}$$

Figure 13:
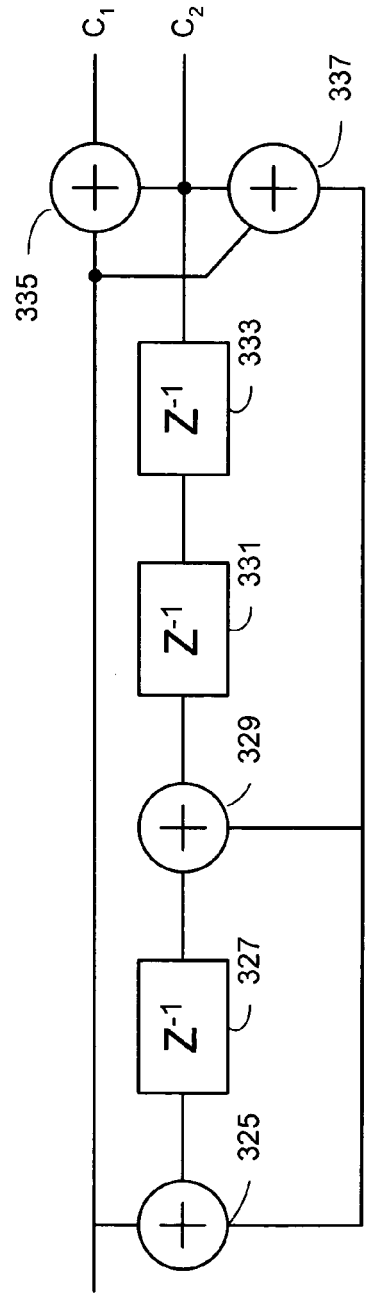
FIG. 13 is a schematic block diagram of a constituent encoder in accordance with the present invention.

FIG. 13 illustrates an embodiment of the constituent encoders 320-322 of FIG. 12 which may be implemented as rate ½ encoders. As shown, the encoder 320-322 includes summing modules 325, 329, 335, 337 and digital one-cycle delays 327, 331, 333.

Figure 14:
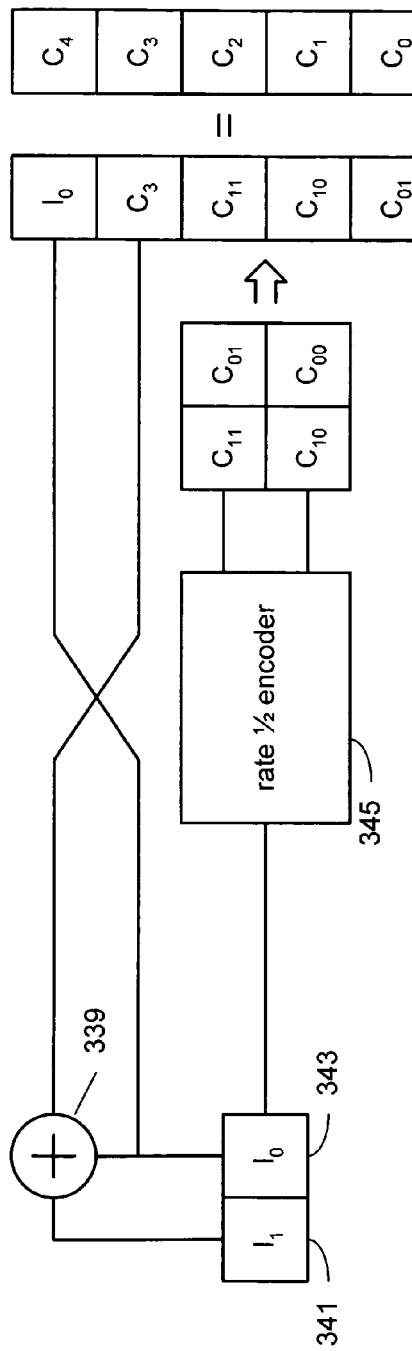
FIG. 14 is a schematic block diagram of an alternate embodiment of a constituent encoder in accordance with the present invention.

FIG. 14 illustrates a schematic block diagram of another embodiment of a constituent encoder 320-322 that utilizes the ½ rate encoder 345 to produce a rate ⅔ths encoder. In this embodiment, two consecutive binary inputs 341, 434 are sent to the rate ½ encoder 345 and to a summing module 339. The output of the rate ⅔ encoder is produced as shown.

Figure 15:
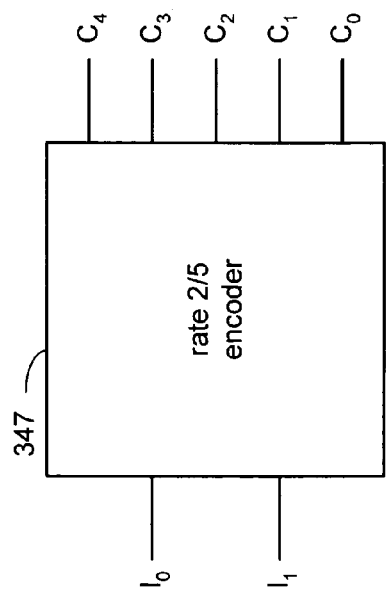
FIG. 15 is a schematic block diagram of a rate ⅔ encoder in accordance with the present invention.

FIG. 15 represents the generally functionality of FIG. 14. The rate ⅔ths encoder 347 may then be utilized as puncture encoders 347 as shown in FIGS. 16 and 17, which have the corresponding QPSK mapping.

Figure 18:
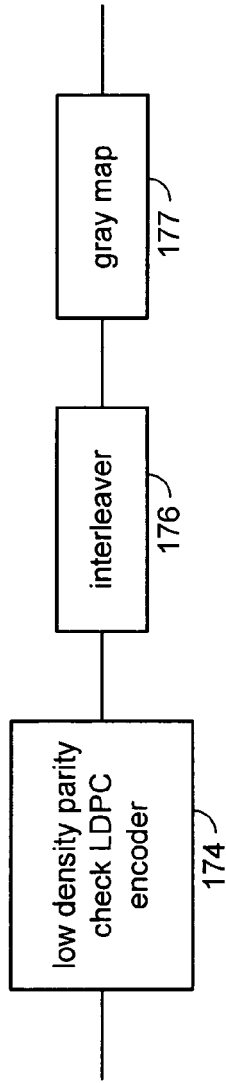
FIG. 18 is a schematic block diagram of a low density parity check encoder in accordance with the present invention.

FIG. 18 illustrates the channel encoder 174 being implemented as a low density parity check (LDPC) encoder. In this embodiment, the encoder includes a low density parity check encoder 174, an interleaver 176 and a gray mapping module 177. The block length may be 2000 and the information length may be 1600. In this instance, the low density parity check binary matrix H=[$H_1$, $H_2$], where $H_1$ is an irregular 400×1600 low density matrix with 1400 columns of weight 3 and 200 columns of weight 7, and all rows of weight 14. Moreover, the distribution of the 1's is pseudo random in order to suit a hardware embodiment. The matrix $H_2$ is a 400×400 matrix which provides a long path with no loops in the bipartite graph between redundancy bit node and check node.

$$H2 = \begin{vmatrix} 100...00 \\ 11\_...00 \\ \_11...00 \\ ... \\ 000...10 \\ 000...11 \end{vmatrix}$$

This parity check matrix provides easy encoding. The code has no circle of loops less than 6. The degree distribution of the bipartite graph of the code is listed in the following table. The total number of edges of the graph is 6399.

| (number of edges emitted from a bit node) | number of nodes |
|---|---|
| bit node degree | |
| 1 | 1 |
| 2 | 399 |
| 3 | 1400 |
| 7 | 200 |
| check node degree | |
| 15 | 1 |
| 16 | 399 |

Figure 19:
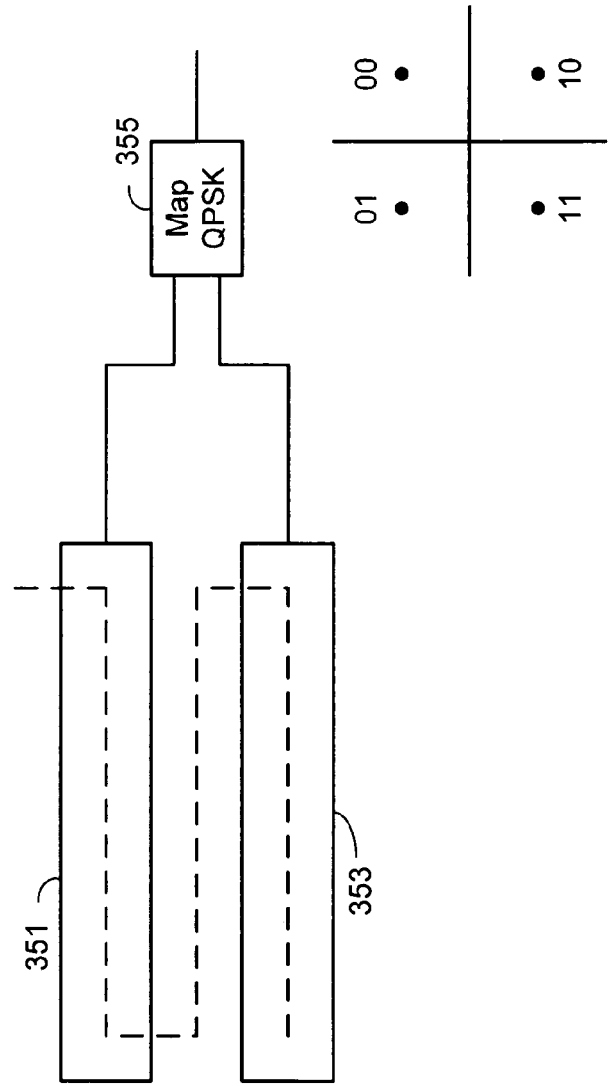
FIG. 19 is an illustration of an interleaver in accordance with the present invention.

FIG. 19 illustrates a particular interleaving 351, 353 and QPSK map 355 that may be utilized by the encoder of FIG. 18. In this embodiment, the rate of the code may be ½ and the LDPC code is symmetric. As such, the interleaving is as shown.

Figure 20:
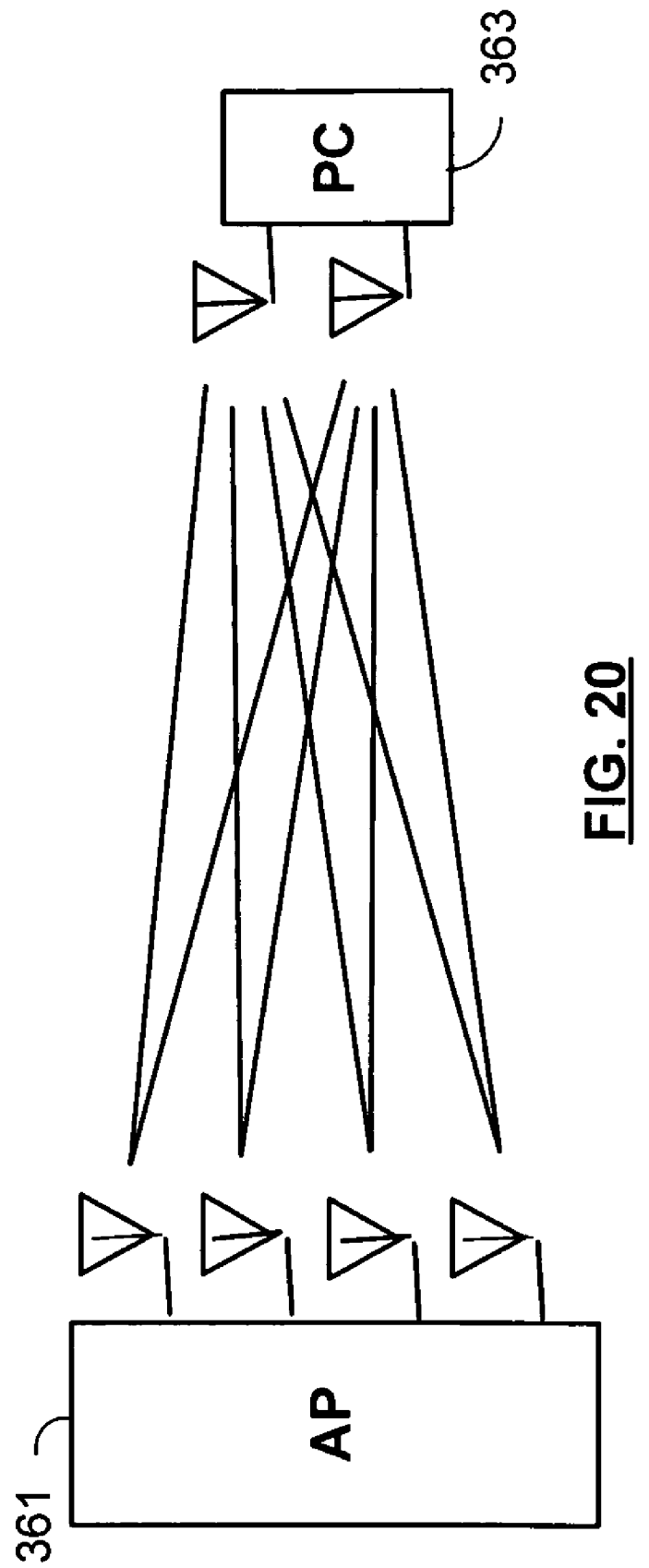
FIG. 20 is a diagram of an example asymmetric communication in accordance with the present invention.

FIG. 20 is a diagram of an example asymmetric communication between an access point (AP) 361 and a wireless communication device (e.g., a personal computer (PC)) 363. In this example, there are 4 transmitting antennas at the AP 361, which may be represented by M, and two receiving antennas at the PC 363, which may be represented by N. In this example, M>N.

Figure 21:
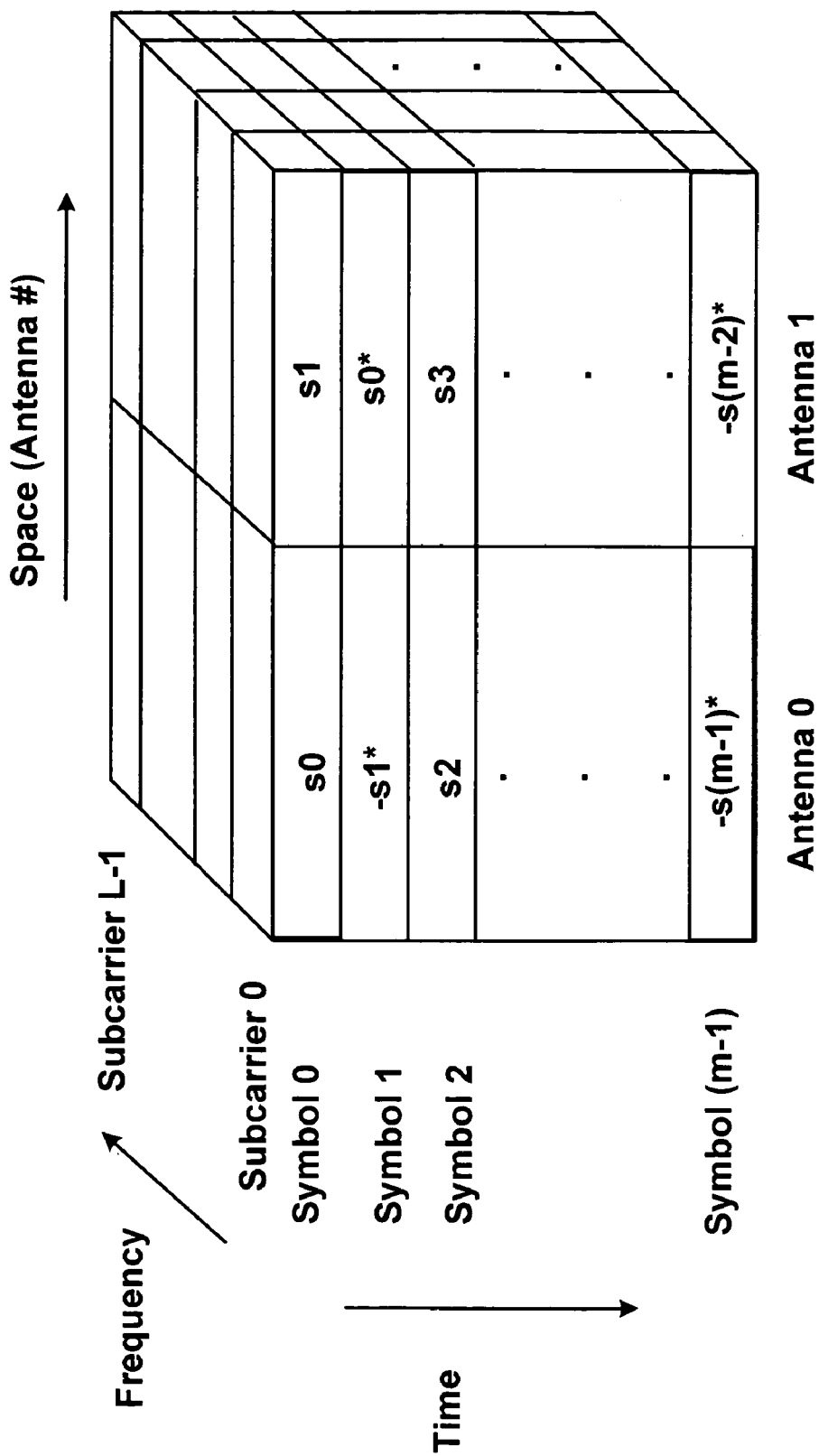
FIG. 21 is a diagram of space-time block coding in accordance with the present invention.

FIG. 21 is a diagram of space-time block coding that plots time versus frequency versus space (i.e., antennas). As shown, the frequency is dividing into a plurality of subcarriers (e.g., 64 for a 20 MHz channel, 128 for a 40 MHz channel). As is also shown, the space is divided into a number of antennas. In this illustration, only two antennas are shown, but more may be used. As is further shown, time is divided into a plurality of symbols. Thus, for each time interval, each subcarrier on each antenna supports a particular symbol. The space time block coding will be further described with reference to FIGS. 22-26.

FIG. 22 is a diagram of two antenna asymmetrical wireless communication. Such a communication may be implemented using simple spatial multiplexing where different information is transmitted on each of the two antennas. Alternatively, space time block coding may be used. In this instance, with a rate=1 Alamouti code, the symbol allocation is as shown, where s0 is the first constellation point transmitted on subcarrier k and s1 is the second constellation point transmitted on subcarrier k+1.

FIG. 23 is a diagram of three antenna asymmetrical wireless communication. In this example, on each OFDM subcarrier index k, the encoded transmission is as shown, where the * indicates a complex conjugate. With this configuration, one rate=1 Alamouti space time block code (STBC) stream may be transmitted along with one uncoded stream per OFMD subcarrier k with a coding delay of two symbol periods.

FIG. 24 is another diagram of three antenna asymmetrical wireless communication. This is like the communication of FIG. 23, except that the STBC is applied to alternating pairs of antennas. The decoding delay is still two symbol periods. As shown, the STBC is across antennas {0, 1} in the first two symbol periods, then {0, 2} in the next two symbol periods, then {2, 3} in the next two. Note that, with the channel code (e.g. constraint length=6 convolutional code) across bits, this might improve the robustness of the lowest rates.

FIG. 25 is a diagram of four antenna asymmetrical wireless communication. In this diagram, some sort of coding is implemented to ensure reliable transmission to, at a minimum, an N=2 station. Further, a transmit two rate=1 Alamouti space-time block coded streams per OFDM subcarrier index k may be constructed as shown. The decoding delay is two symbol periods.

FIG. 26 is another diagram of four antenna asymmetrical wireless communication. This is similar to the communication of FIG. 25, except that the STBC is applied to alternating pairs of antennas. The decoding delay is still two symbol periods. For example, the STBC is across antennas {0, 1} and {2, 3} in the first two symbol periods, then {0, 2} and {1, 3}.

Note that, with the channel code (e.g. constraint length=6 convolutional code) across bits, this might improve the robustness of the lowest rates.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments of a multiple input/multiple output transceiver for use in wireless communication systems. As one of average skill in the art will appreciate, other embodiments may be derived from the teaching of the present invention without deviating from the scope of the claims.

Mode Selection Tables:

TABLE 1

| | | | | | | | | | |
|---|---|---|---|---|---|---|---|---|---|
| | | 2.4 GHz, 20/22 MHz channel BW, 54 Mbps max bit rate | | | | | | | |
| Rate | Modulation | Code Rate | NBPSC | NCBPS | NDBPS | EVM | Sensitivity | ACR | AACR |
| | Barker | | | | | | | | |
| 1 | BPSK | | | | | | | | |
| | Barker | | | | | | | | |
| 2 | QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask Frequency Offset | 1 dBr |
|---|---|
| −9 MHz to 9 MHz | 0 |
| +/− 11 MHz | −20 |
| +/− 20 MHz | −28 |
| +/− 30 MHz and greater | −50 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9-continued channelization for Table 8

| Channel | Frequency (MHz) | Country | Channel | Frequency (MHz) | Country |
|---|---|---|---|---|---|
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask Frequency Offset | 2 dBr |
|---|---|
| −19 MHz to 19 MHz | 0 |
| +/− 21 MHz | −20 |
| +/− 30 MHz | −28 |
| +/− 40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

As an example of gains that can be obtained from MIMO, channel measurements may be used. In this example, assume K sub-channel OFDM system with equal transmit power per tone. The equal power (i.e. no space-time waterfilling) N×N MIMO capacity per sub-channel is [Telatar, Foschini and Gans]:

$$C_k = \log_2\left(\det\left[I_N + \frac{\rho}{N} H_k^H H_k\right]\right)$$

Where k—tone number, K—number of tones, Hk—N×N channel matrix (per tone), N—number of antennas, ρ=SNR/κ=normalized receiver SNR, and $$\kappa = \frac{1}{KN^2} \sum_{k=0}^{K-1} \sum_{m=0}^{N-1} \sum_{n=0}^{N-1} H_k^*(n,m) H_k(n,m)$$

Accordingly, singular values of the channel matrix for each sub-channel determine the capacity of that sub-channel, where the singular value decomposition may be defined as $$H_k = U_k \sum_k V_k^H \text{ with } \sum_k = \begin{bmatrix} \sigma_{1k} & & \\ & \bullet & \\ & & \sigma_{Nk} \end{bmatrix}$$

Then capacity of kth subchannel can then be expressed in terms of $$C_k = \sum_{n=0}^{N-1} \log_2\left(1 + \frac{\rho}{N} \sigma_{n,k}^2\right)$$

As can be seen, capacity is maximized when the singular values are of equal value.

From this example, expected MIMO performance gains include: (a) under moderate SNR conditions, MIMO can achieve significant data rate improvements, where the data rate increase is proportional to N (# of TX antennas) and will require higher SNR. Note that the range reduction may become more severe as N increases. (b) N should be selected based on practical considerations such as, but not limited to, implementation complexity and maximum target rate that is competitive with other techniques. In one embodiment, max N=4.

What is claimed is:

1. A method for asymmetrical MIMO wireless communication, the method comprises:
   determining a number of transmission antennas for the asymmetrical MIMO wireless communication;
   determining a number of reception antennas for the asymmetrical MIMO wireless communication;
   determining whether the asymmetric MIMO wireless communication will use spatial multiplexing or space-time block coding by:
      using the spatial multiplexing whenever the number of reception antennas equals or exceeds the number of transmission antennas; and
      using the spatial time block coding whenever the number of reception antennas is less than the number of transmission antennas, wherein, when both the number of reception antennas is an even number and the number of transmission antennas exceeds the number of reception antennas by an odd number, the spatial time block coding comprises:
         selecting one of the transmission antennas for transmitting non-spatial time block coding constellation points during first and second time intervals; and
         grouping remaining transmission antennas of the transmission antennas into at least one group of transmission antennas, wherein the at least one group of transmission antennas transmits spatial time block coding constellation points.

2. The method of claim 1, wherein the determining the number of reception antennas comprises:
   receiving, from a receiving wireless communication device, the number of reception antennas.

3. The method of claim 1, wherein the selecting one of the transmission antennas comprises:
   from spatial-time coding interval to spatial-time coding interval, selecting another one of the transmission antennas for transmitting the non-spatial time block coding constellation points.

4. The method of claim 1, wherein, when the number of transmission antennas exceeds the number of reception antennas by an even number, the spatial time block coding comprises:
   dividing the transmission antennas into at least two groups, where each of the at least two groups includes at least two of the transmission antennas; and
   individually performing the spatial time block coding for the at least two groups.

5. The method of claim 4 further comprises:
   from spatial-time coding interval to spatial-time coding interval, dividing the transmission antennas into at least two different groups.

6. A method for asymmetrical MIMO wireless communication, the method comprises:
   determining a number of transmission antennas for the asymmetrical MIMO wireless communication;
   determining a number of reception antennas for the asymmetrical MIMO wireless communication;
   whenever the number of transmission antennas exceeds the number of reception antennas, using spatial time block coding for the asymmetrical MTMO wireless communication, wherein, when both the number of reception antennas is an even number and the number of transmission antennas exceeds the number of reception antennas by an odd number, the spatial time block coding comprises:
      selecting one of the transmission antennas for transmitting non-spatial time block coding constellation points during first and second time intervals; and
      grouping remaining transmission antennas of the transmission antennas into at least one group of transmission antennas, wherein the at least one group of transmission antennas transmits spatial time block coding constellation points; and
   whenever the number of transmission antennas does not exceed the number of reception antennas, using spatial multiplexing for the asymmetrical MIMO wireless communication.

7. The method of claim 6, wherein the determining the number of reception antennas comprises:
   receiving, from a receiving wireless communication device, the number of reception antennas.

8. The method of claim 7, wherein the selecting one of the transmission antennas comprises:
   from spatial-time coding interval to spatial-time coding interval, selecting another one of the transmission antennas for transmitting the non-spatial time block coding constellation points.

9. The method of claim 6, wherein, when the number of transmission antennas exceeds the number of reception antennas by an even number, the spatial time block coding comprises:
   dividing the transmission antennas into at least two groups, where each of the at least two groups includes at least two of the transmission antennas; and
   individually performing the spatial time block coding for the at least two groups.

10. The method of claim 9 further comprises:
    from spatial-time coding interval to spatial-time coding interval, dividing the transmission antennas into at least two different groups.

11. A radio frequency (RF) transmitter comprises:
    a baseband processing module operably coupled to convert outbound data into an outbound symbol stream; and
    a transmitter section operably coupled to convert the outbound symbol stream into outbound RF signals, wherein the transmitter section includes transmission antennas, and wherein the baseband processing module is further operably coupled to:
       determine a number of the transmission antennas for the asymmetrical MIMO wireless communication;
       determine a number of reception antennas for the asymmetrical MIMO wireless communication;
       determine whether the asymmetric MIMO wireless communication will use spatial multiplexing or space-time block coding by:
          using the spatial multiplexing whenever the number of reception antennas equals or exceeds the number of transmission antennas; and
          using the spatial time block coding whenever the number of reception antennas is less than the number of transmission antennas wherein when both the number of reception antennas is an even number and the number of transmission antennas exceeds the number of reception antennas by an odd number, perform the spatial time block coding by:

selecting one of the transmission antennas for transmitting non-spatial time block coding constellation points during first and second time intervals; and grouping remaining transmission antennas of the transmission antennas into at least one group of transmission antennas, wherein the at least one group of transmission antennas transmits spatial time block coding constellation points.

12. The RF transmitter of claim 11, wherein the baseband processing module is further operably coupled to determine the number of reception antennas by:

receiving, from a receiving wireless communication device, the number of reception antennas.

13. The RF transmitter of claim 11, wherein the baseband processing module is further operably coupled to select one of the transmission antennas by:

from spatial-time coding interval to spatial-time coding interval, selecting another one of the transmission antennas for transmitting the non-spatial time block coding constellation points.

14. The RF transmitter of claim 11, wherein the baseband processing module is further operably coupled to, when the number of transmission antennas exceeds the number of reception antennas by an even number, perform the spatial time block coding by:

dividing the transmission antennas into at least two groups, where each of the at least two groups includes at least two of the transmission antennas; and individually performing the spatial time block coding for the at least two groups.

15. The RF transmitter of claim 14, wherein the baseband processing module is further operably coupled to:

from spatial-time coding interval to spatial-time coding interval, divide the transmission antennas into at least two different groups.

16. A radio frequency (RF) transmitter comprises:

a baseband processing module operably coupled to convert outbound data into an outbound symbol stream; and a transmitter section operably coupled to convert the outbound symbol stream into outbound RF signals, wherein the transmitter section includes transmission antennas, and wherein the baseband processing module is further operably coupled to:

determine a number of transmission antennas for the asymmetrical MIMO wireless communication;

determine a number of reception antennas for the asymmetrical MIMO wireless communication;

whenever the number of transmission antennas exceeds the number of reception antennas, use spatial time block coding for the asymmetrical MIMO wireless communication wherein, when both the number of reception antennas is an even number and the number of transmission antennas exceeds the number of reception antennas by an odd number, perform the spatial time block coding by:

selecting one of the transmission antennas for transmitting non-spatial time block coding constellation points during first and second time intervals; and grouping remaining transmission antennas of the transmission antennas into at least one group of transmission antennas, wherein the at least one group of transmission antennas transmits spatial time block coding constellation points; and whenever the number of transmission antennas does not exceed the number of reception antennas, use spatial multiplexing for the asymmetrical MIMO wireless communication.

17. The RF transmitter of claim 16, wherein the baseband processing module is further operably coupled to determine the number of reception antennas by:

receiving, from a receiving wireless communication device, the number of reception antennas.

18. The RF transmitter of claim 16, wherein the baseband processing module is further operably coupled to select one of the transmission antennas by:

from spatial-time coding interval to spatial-time coding interval, selecting another one of the transmission antennas for transmitting the non-spatial time block coding constellation points.

19. The RF transmitter of claim 16, wherein the baseband processing module is further operably coupled to, when the number of transmission antennas exceeds the number of reception antennas by an even number, perform the spatial time block coding by:

dividing the transmission antennas into at least two groups, where each of the at least two groups includes at least two of the transmission antennas; and individually performing the spatial time block coding for the at least two groups.

20. The RF transmitter of claim 16, wherein the baseband processing module is further operably coupled to:

from spatial-time coding interval to spatial-time coding interval, divide the transmission antennas into at least two different groups.

* * * * *